United States Patent
Duron et al.

(10) Patent No.: US 8,687,529 B2
(45) Date of Patent: Apr. 1, 2014

(54) CIRCULATOR TUNING FOR REDUCED INTERMODULATION DISTORTION IN A WIRELESS COMMUNICATION DEVICE

(75) Inventors: Mark W. Duron, East Patchogue, NY (US); Richard T. Knadle, Dix Hills, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 331 days.

(21) Appl. No.: 13/188,732

(22) Filed: Jul. 22, 2011

(65) Prior Publication Data

US 2013/0021955 A1 Jan. 24, 2013

(51) Int. Cl.
*H04L 5/00* (2006.01)

(52) U.S. Cl.
USPC .......................................................... 370/297

(58) Field of Classification Search
USPC .......................................................... 370/297
See application file for complete search history.

(56) References Cited

U.S. PATENT DOCUMENTS

| | | | |
|---|---|---|---|
| 6,111,503 A * | 8/2000 | Javitt et al. | 340/552 |
| 7,816,995 B1 | 10/2010 | Allen et al. | |
| 8,285,217 B1 * | 10/2012 | Rockway et al. | 455/63.1 |
| 2004/0116066 A1 * | 6/2004 | Siddall | 455/1 |
| 2005/0216213 A1 * | 9/2005 | Sternberg et al. | 702/69 |
| 2006/0234627 A1 * | 10/2006 | Cartin et al. | 455/24 |
| 2009/0285135 A1 * | 11/2009 | Rousu et al. | 370/297 |
| 2009/0286569 A1 * | 11/2009 | Rousu et al. | 455/553.1 |
| 2011/0116423 A1 * | 5/2011 | Rousu et al. | 370/297 |
| 2011/0250854 A1 * | 10/2011 | Hamparian | 455/101 |
| 2012/0274425 A1 * | 11/2012 | Mung et al. | 333/24 R |

* cited by examiner

*Primary Examiner* — Mark Rinehart
*Assistant Examiner* — Christopher R Crompton
(74) *Attorney, Agent, or Firm* — Brian M. Mancini (57) ABSTRACT

A mobile wireless communication device includes a circulators coupled between a respective communications arrangement and their antennas. Each circulator includes a coupled tuning network, wherein the tuning networks are operable to tune their circulators for maximum isolation from cross coupling between the power amplifiers within an operating frequency band of the respective communications arrangement.

12 Claims, 6 Drawing Sheets

-- PRIOR ART --

CIRCULATOR TUNING FOR REDUCED INTERMODULATION DISTORTION IN A WIRELESS COMMUNICATION DEVICE

FIELD OF THE DISCLOSURE

The present invention relates generally to wireless communication devices and more particularly to a circulator used in a mobile wireless communication device.

BACKGROUND

Wireless communication protocols and devices, such as Long Term Evolution devices, have been introduced that allow the wireless communication of concurrent voice and data services. Typically, this involves a device with two transceivers and two respective antennas, one for each service. However such concurrent communication can cause cross coupling of signals, which can result in intermodulation distortion (IMD) related issues. As a result, vendors of such devices desire to provide a minimum amount of isolation between antennas to reduce cross coupling. However, this can be problematic in a small communication device, such as a mobile handheld device, where the package size and antenna orientation parameters are set to optimize ergonomic considerations. Simulations have been performed, using standard packaging of handheld mobile communication devices, where the isolation between different antenna structures upon the same device can drop to less then 3 dB in many cases, which is unacceptable for IMD performance.

One technique for increasing isolation between antennas is to use a circulator canceller in order to increase channel isolation. Although this technique works, it has only been implemented in large communication devices using a large, tuned and shielded circulator, which is expensive, and has only been operable for very high power levels. None of these operational parameters can be carried over to a small handheld wireless device using a small, low-cost circulator. In particular, miniature circulators and isolators are inherently low performance, narrow band devices due to limits on size and magnet configuration, and these miniature circulators have minimal shielding, allowing their performance to be influenced by nearby fields.

Accordingly, there is a need for to provide antenna isolation in a small wireless communication device that uses commercially available low-cost circulators.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

The present invention provides RF energy isolation between concurrent operating power amplifiers in a small wireless communication device using commercially available low-cost circulators. In particular, the present invention uses a tuning network coupled to a circulator to over come the above limitations. In addition, the present invention provides a novel tuning technique for the circulator that allows the device designer to move antennas closer together and to make the package smaller while still being able to run at full power levels for the device.

Figure 1:
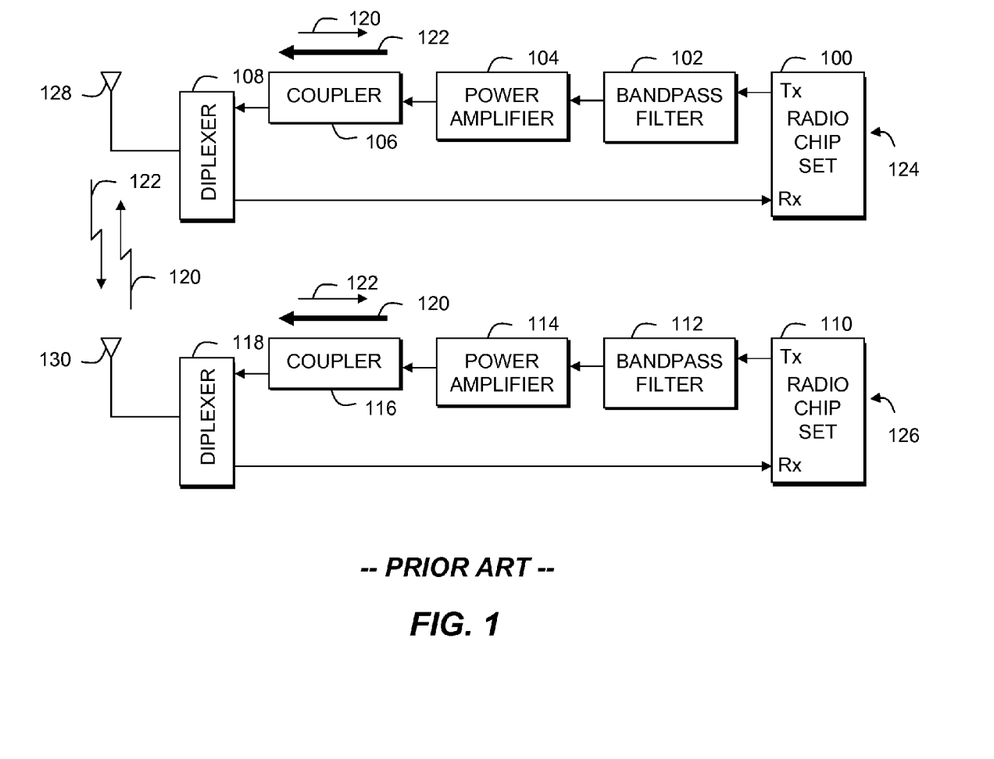
FIG. 1 is a block diagram of a prior art mobile handheld wireless communication device with the ability to transmit two communication streams.

FIG. 1 shows a simplified block diagram of a prior art mobile wireless communication device operable to provide two full duplex communication streams concurrently, such as one voice stream and one data stream, for example. One communication stream can be supported by a first communication arrangement 124 including a radio chip set 100 with transmit (Tx) and (Rx) receive functions. The chip set 100 can supply a first transmit signal 122 via a bandpass filter 102, a power amplifier 104, a coupler 106, and a diplexer 108, to an antenna 128 for transmitting the first transmit signal 122. Another communication stream can be supported by a second communication arrangement 126 including another chip set 110 that can supply a second transmit signal 120 via its own bandpass filter 112, a power amplifier 114, a coupler 116, and a diplexer 118, to an antenna 130 for transmitting the second transmit signal 120.

Since the two antennas are located within a mobile handheld wireless communication device, they will be located in proximity to each other, even if they are on opposite ends of the device. As a result, there is the potential for signals from one communication arrangement to leak into, and cross couple with, the transmit circuitry of the other communication arrangement. For example, as the first communication arrangement transmits its signal 122, this signal will reach and cross couple with the antenna 130 of the second communication arrangement. This signal 122 can leak through the diplexer 118 and the second coupler 116 and reach the power amplifier 114 of the second communication arrangement. This reverse direction leakage from the first transmitter combining in the power amplifier of the second transmitter can produce third and fifth order intermodulation distortion (IMD) products, which are undesirable. Similarly, as the second communication arrangement transmits its signal 120, this signal will reach and cross couple with the antenna 128 of the first communication arrangement. This signal 120 can leak through the first diplexer 108 and the coupler 106 and reach the power amplifier 104 of the first communication arrangement. This reverse direction leakage from the second transmitter combining in the power amplifier of the first transmitter can also produce undesirable third and fifth order IMD products. The present invention reduces IMD products by introducing a tuned circulator into the signal paths of the first and second communication arrangement.

Figure 2:
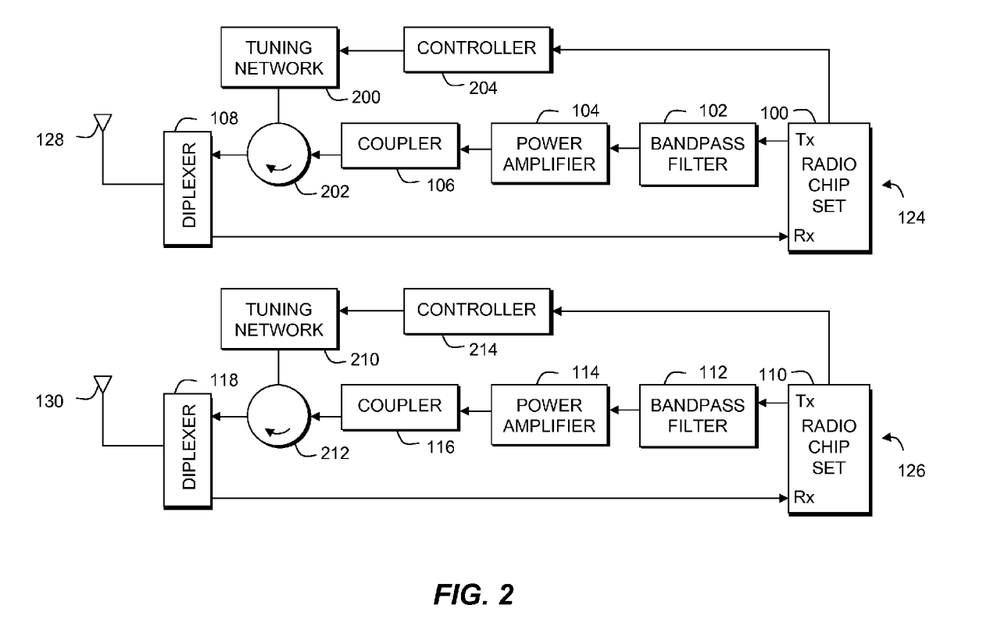
FIG. 2 is a simplified block diagram of one embodiment of a mobile handheld wireless communication device with the ability to transmit two communication streams, in accordance with the present invention.

FIG. 2 shows a circuit adapted to support the inventive concepts of the embodiments of the present invention. In particular, the present invention adds a miniature circulator 202, 212 into each communication stream. For example, a first circulator 202 can have a first port coupled to a coupler 106 of the first transmit stream and a second port coupled to a diplexer 108 to the antenna 128. Similarly, a second circulator 212 can have a first port coupled to a coupler 116 of the second transmit stream and a second port coupled to a diplexer 118 to the antenna 130. A tuning network 200, 210 is coupled to a third port of the circulators 202, 212, in accordance with the present invention. Typical circulators available for miniature devices such as mobile communication devices are not finely tuned devices. In addition, a typical isolator circulator for a miniature device only has two external ports, with the third port internally terminated with a fifty ohm resistive load. The present invention utilizes a miniature circulator with three external ports, where the third port is terminated with a tuning network that can be statically or dynamically tuned. For example, the tuning network could be tuned by a spectrum/network analyzer during manufacture of the device, or the tuning network could be dynamically tuned in real-time using one or more controller 204, 214 that receives feedback of IMD performance from a receiver of the radio chip set 100, 110.

Figure 3:
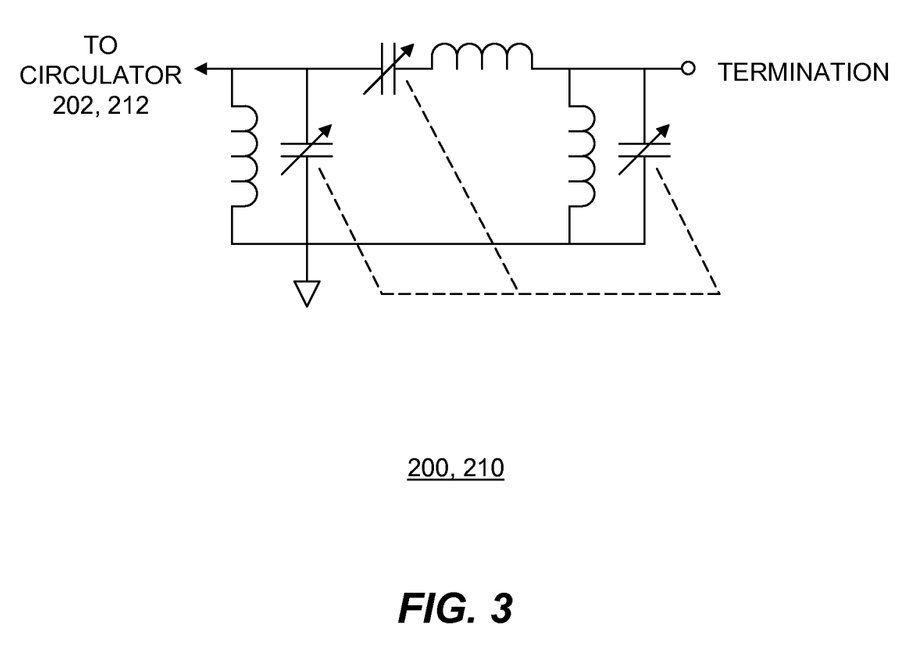
FIG. 3 is a circuit diagram of one embodiment of the tuning network of FIG. 2.

FIG. 3 shows the tuning network 200, 210 of FIG. 2. The termination is typically a fifty ohm resistance, but could be another reactance, as needed. The tuning network is capable of synthesizing virtually all points upon the Smith chart, limited only by the quality of the components used. Losses in the tuning components can cause the extreme outer edges of the Smith chart to be inaccessible to the tuning network, although 3 dB S11 at all phases is realizable. The inductors and/or capacitors of the tuning network can be tunable. Preferably, only tunable capacitors are used (as shown) since they are more easily realizable although tunable inductors or delays can also be used. Also, various RF switches and reactors (not shown) can be placed around and in the tuning network to enhance tuning range or bandwidth. Although a pi-network is shown in this embodiment, it should be recognized that many variations of tuning network could be used equally well in the present invention. For example, various combinations and subsections of this circuit can be used to synthesize L, H and T networks, even though a pi-network is shown here.

In one embodiment, the tuning network of the present invention is statically tuned at the factory and is passive. Any level changes of either of the two signal sources is proportionately scaled without the need to re-adjust the tuning network. Such a passive network can be realized in a non-programmable or fixed tuned version of this circuit. In such a configuration the bandwidth will suffer, but the isolation at center frequency can be greatly enhanced. In another embodiment, the tuning network can be dynamically adjusted in real-time. For example, IMD products can be measured by the receiver of the radio chip sets, and a controller can tune the tuning network to minimize the actual IMD products as seen by the impacted receiver. Specifically, the controller uses IMD metrics to servo the tuning network components to adapt the tuning network to the changing RF environment.

Figure 4:
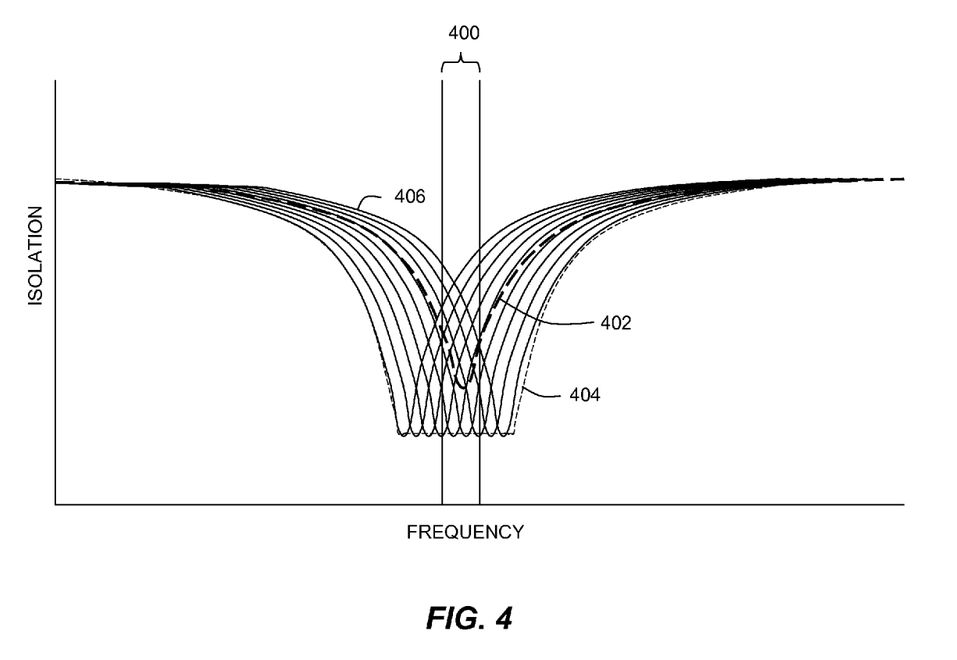
FIG. 4 is a graphical representation of the frequency performance of the circuit of FIG. 2

A typical miniature isolator or circulator demonstrates a narrow frequency band isolation response. In FIG. 4, the dotted-line curve 402 denotes the typical narrow band isolation of a miniature circulator used in mobile radio applications. The circulator can be statically tuned for maximum S11 isolation by complementing the energy vector coming from the circulator within the operating frequency band 400, in accordance with one embodiment of the present invention. However, by providing a tunable circulator, the present invention can also provide an embodiment for dynamically tuning the circulator to provide the multiple solid-line curves 406 showing various tuned frequencies across the working band of the tuned circulator. In effect, the present invention can tune for a frequency band that far exceeds what a passively tuned circulator can provide by itself. The dotted-line curve 404 denotes the composite isolation of all of the solid-line curves 406, and demonstrates this further improvement proved by the present invention.

Figure 5:
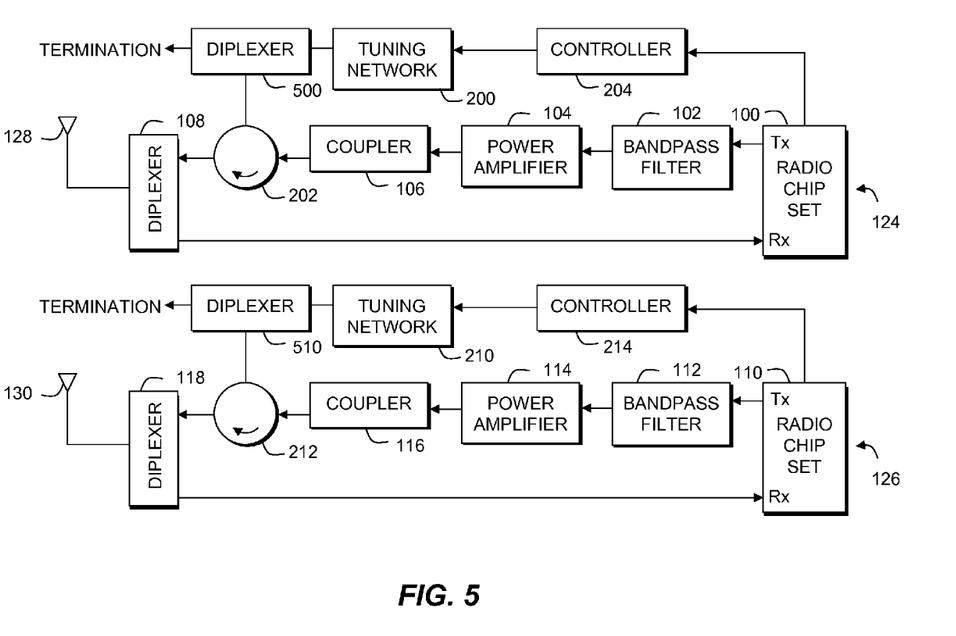
FIG. 5 is a simplified block diagram of a further embodiment of a mobile handheld wireless communication device with the ability to transmit two communication streams, in accordance with the present invention.

FIG. 5 shows a further embodiment of the present invention where a diplexer 500, 510 is inserted between the circulator 202, 212 and the tuning network 200, 210. The extra diplexer is tuned to the in-band power amplifier operational frequency, and the out-of-band offending frequency. This additional diplexer allows the tuning network to further tune out any offending frequency (even when that frequency is out-of-band for the circulator). The termination is chosen to terminate the normal in-band circulator frequency. This choice of termination maintains maximum efficiency in the forward path of the circulator by minimizing the mismatch caused by the tuning network and the antenna to in-band frequencies while still allowing cancellation of an offending out-of-band frequency. Therefore, the circulator is still effective as an isolator outside of the passband, while not affecting forward path S21 performance of the circulator in-band. As a result, the dynamic tuning ability of the present invention is able to separate the effects of in-band and out-of-band signal reflections, thereby maximizing the selectivity of the diplexer and the directivity (S21) of the coupler. It should be noted that a duplexer or other cross over network may replace the diplexer 500, 510 in certain instances.

FIGS. 2, 3 and 5 show circuits adapted to support the inventive concepts of the embodiments of the present invention. Those skilled in the art will recognize that the figures do not depict all of the equipment necessary for the device and display to operate but only those components particularly relevant to the description of embodiments herein. For example, the device can include power supplies, separate processors, controllers, interfaces, buffers, transceivers, and the like, which are well-known. In addition, processing and controlling units are known to comprise basic components such as, but not limited to, microprocessors, microcontrollers, memory cache, application-specific integrated circuits (ASICs), and/or logic circuitry.

Those skilled in the art are aware of the many design and development techniques available to configure the operation of a device. Therefore, the entities shown represent a known system that has been adapted, in accordance with the description herein, to implement various embodiments of the present invention. Furthermore, those skilled in the art will recognize that aspects of the present invention may be implemented in and across various physical components and none are necessarily limited to single platform implementations.

Figure 6:
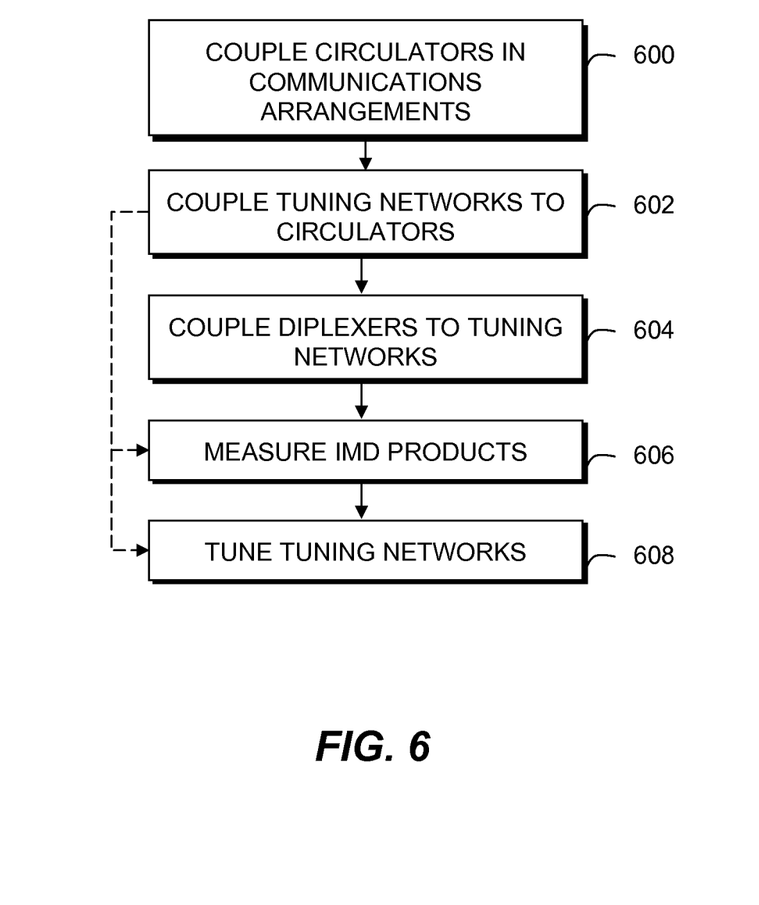
FIG. 6 is a block diagram of a method, in accordance with the present invention.

FIG. 6 illustrates a method for reduced intermodulation distortion in a mobile wireless communication device, in accordance with the present invention. The method includes a first step of coupling 600 a first circulator between a first communications arrangement and a first antenna, and coupling a second circulator coupled between a second communications arrangement and a second antenna.

A next step includes coupling 602 a first tuning network to a port of the first circulator, and coupling a second tuning network to a port of the second circulator.

An optional step includes coupling 604 a diplexer between each circulator and its associated tuning network.

For a dynamic tuning embodiment, a next step includes measuring 606 intermodulation products produced by a power amplifier in a communication arrangement and providing intermodulation metrics therefrom.

A next step includes tuning 608 the tuning networks to tune the circulators for maximum isolation from cross coupling between the power amplifiers within an operating frequency band of the respective communications arrangement. For a dynamic tuning embodiment, tuning 608 includes dynamically tuning the tuning network in response to the intermodulation metrics. In practice, tuning 608 includes tuning the circulators outside of the operating frequency band. Where optional diplexers are coupled 604 between each circulator and its associated tuning network, tuning 608 includes tuning the diplexer to an in-band operational frequency, and terminating the diplexer for maximum efficiency in a forward path of the circulator and minimum mismatch caused by the tuning network to in-band frequencies.

Advantageously, the present invention provides a tunable circulator for a mobile handheld wireless communication device, wherein the tunable circulator is effective to enhance isolation for leakage, often more then 20 dB.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized controllers of processors such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A mobile wireless communication device, comprising:
   a first circulator coupled between a first communications arrangement and a first diplexer,
   the first diplexer coupled to the first communications arrangement and coupling a first antenna to the first circulator;
   a first tuning network coupled to a port of the first circulator;

a second circulator coupled between a second communications arrangement and a second diplexer, the second diplexer coupled to the second communications arrangement and coupling a second antenna to the second circulator;

a second tuning network coupled to a port of the second circulator, wherein the tuning networks are operable to tune the circulators for maximum isolation from cross coupling between power amplifiers of the respective communications arrangements within an operating frequency band of the respective communications arrangements; and an additional diplexer coupled between each circulator and its associated tuning network, wherein the additional diplexer is tuned to an in-band operational frequency and an out-of-band offending frequency.

2. The device of claim 1, wherein each communications arrangement is operable to measure intermodulation products produced by the associated power amplifier and provide intermodulation metrics therefrom, and further comprising a controller coupled to the tuning network, the controller operable to dynamically tune the tuning network in response to the intermodulation metrics.

3. The device of claim 1, wherein the tuning network is a pi-network including tunable capacitors.

4. The device of claim 1, wherein the tuning networks are also operable to tune the circulators outside of the operating frequency band.

5. The device of claim 1, wherein the diplexer is terminated for maximum efficiency in a forward path of the circulator and minimum mismatch caused by the tuning network to in-band frequencies.

6. A mobile wireless communication device, comprising:

a first communications arrangement operable to measure intermodulation products produced by an associated power amplifier and provide intermodulation metrics therefrom;

a first circulator with three ports, a first port coupled to the first communications arrangement;

a first diplexer coupled between a second port of the first circulator and a first antenna, the first diplexer also coupled to the first communications arrangement;

a first tuning network coupled to a third port of the first circulator;

a first controller coupled to the first tuning network, the first controller operable to dynamically tune the first tuning network in response to the intermodulation metrics to tune the first circulator for maximum isolation from cross coupling from a second communications arrangement within an operating frequency band of the first communications arrangement;

a second circulator with three ports, a first port coupled to a second communications arrangement;

a second diplexer coupled between a second port of the second circulator and a second antenna, the first diplexer also coupled to the second communications arrangement;

a second tuning network coupled to a third port of the second circulator;

a second controller coupled to the second tuning network, the second controller operable to dynamically tune the second tuning network in response to the intermodulation metrics to tune the second circulator for maximum isolation from cross coupling from the first communications arrangement within an operating frequency band of the second communications arrangement; and an additional diplexer coupled between each circulator and its associated tuning network, wherein the additional diplexer is tuned to an in-band operational frequency and an out-of-band offending frequency.

7. The device of claim 6, wherein the tuning networks are also operable to tune their respective circulators outside of their operating frequency band.

8. The device of claim 6, wherein the diplexer is terminated to maximizing the selectivity of the diplexer and the directivity of a coupler of the respective communications arrangement.

9. A method for reduced intermodulation distortion in a mobile wireless communication device, the method comprising the steps of:

coupling a first circulator between a first communications arrangement and a first diplexer, the first diplexer coupled to the first communications arrangement and coupling a first antenna to the first circulator, and coupling a second circulator coupled between a second communications arrangement and a second diplexer, the second diplexer coupled to the second communications arrangement and coupling a second antenna to the second circulator;

coupling a first tuning network to a port of the first circulator, and coupling a second tuning network to a port of the second circulator;

tuning the tuning networks to tune the circulators for maximum isolation from cross coupling between respective power amplifiers of the respective communications arrangements within an operating frequency band of the respective communications arrangements; and coupling an additional diplexer between each circulator and its associated tuning network, wherein tuning includes tuning the additional diplexer to an in-band operational frequency and an out-of-band offending frequency.

10. The method of claim 9, further comprising the step of measuring intermodulation products produced by a power amplifier in a communication arrangement and providing intermodulation metrics therefrom, and wherein tuning includes dynamically tuning the tuning network in response to the intermodulation metrics.

11. The method of claim 9, wherein tuning includes tuning the circulators outside of the operating frequency band.

12. The method of claim 9, wherein tuning includes terminating the diplexer for maximum efficiency in a forward path of the circulator and minimum mismatch caused by the tuning network to in-band frequencies.

* * * * *